US012618706B2

(12) United States Patent
Caglioni

(10) Patent No.: US 12,618,706 B2
(45) Date of Patent: May 5, 2026

(54) DRAFT SHIELD COMPRISING A SWIVELING DOOR

(71) Applicant: Mettler-Toledo GmbH, Greifensee (CH)

(72) Inventor: Louis Caglioni, Oberwil (CH)

(73) Assignee: Mettler-Toledo GmbH, Greifensee (CH)

( * ) Notice: Subject to any disclaimer, the term of this patent is extended or adjusted under 35 U.S.C. 154(b) by 304 days.

(21) Appl. No.: 18/616,348

(22) Filed: Mar. 26, 2024

(65) Prior Publication Data

US 2024/0337524 A1    Oct. 10, 2024

(30) Foreign Application Priority Data

Apr. 4, 2023    (EP) ..................................... 23166631

(51) Int. Cl.
*G01G 21/30* (2006.01)

(52) U.S. Cl.
CPC .................................... *G01G 21/30* (2013.01)

(58) Field of Classification Search
CPC ............................. G01G 21/30; G01G 21/286
USPC ........................................................ 177/180
See application file for complete search history.

(56) References Cited

U.S. PATENT DOCUMENTS 7,834,278 B1    11/2010  Zeiss et al.
10,254,154 B2 *  4/2019  Kuhlmann ............ E05C 19/022

| | | | | |
|---|---|---|---|---|
| 11,002,592 | B2 | 5/2021 | Buchmann et al. | |
| 2003/0188898 | A1 * | 10/2003 | Aebi .................... | G01G 21/286 |
| | | | | 177/156 |
| 2003/0221874 | A1 * | 12/2003 | Leisinger ............. | G01G 21/286 |
| | | | | 177/180 |
| 2006/0157287 | A1 * | 7/2006 | Leisinger ............. | G01G 21/286 |
| | | | | 177/180 |
| 2011/0132669 | A1 * | 6/2011 | Laubstein ............ | G01G 21/286 |
| | | | | 177/181 |
| 2016/0265963 | A1 * | 9/2016 | Kuhlmann ........... | G01G 21/286 |
| 2019/0316954 | A1 * | 10/2019 | Buchmann ........... | G01G 21/286 |
| 2019/0376836 | A1 * | 12/2019 | Zehnder ................ | G01G 21/22 |
| 2020/0284642 | A1 * | 9/2020 | Zehnder .............. | G01G 13/003 |
| 2020/0284645 | A1 * | 9/2020 | Zehnder ................ | G01G 17/06 |

FOREIGN PATENT DOCUMENTS

| | | | | |
|---|---|---|---|---|
| CN | 215003879 | U | 12/2021 | |
| EP | 2060885 | A1 * | 5/2009 | .......... G01G 21/286 |
| EP | 2924401 | B1 * | 12/2016 | .......... G01G 21/286 |
| EP | 3557200 | A1 * | 10/2019 | ............. G01G 21/23 |

(Continued)

*Primary Examiner* — Peter J Macchiarolo
*Assistant Examiner* — Mireille S Sadate-Moualeu
(74) *Attorney, Agent, or Firm* — Standley Law Group LLP; Jeffrey S. Standley; Adam J. Smith

(57) ABSTRACT

A draft shield for a balance is disclosed. The draft shield includes a first wall, a second wall, and at least a first door. The first wall and the second wall adjoin each other perpendicularly and the first door is provided perpendicular to each of the first wall and the second wall. The first door is arranged and configured to swivel between a closed position and an open position. When in the closed position, the first door adjoins a first edge of the first wall and a first edge of the second wall. A swivel axis of the first door extends perpendicular to a face of the first door such that the first door is configured to swivel in the plane of the first door.

18 Claims, 5 Drawing Sheets

(56)         References Cited

FOREIGN PATENT DOCUMENTS

| JP | H0562825 U | * | 8/1993 | |
| JP | 2004219314 A | * | 8/2004 | ............. G01G 21/28 |
| WO | WO-2014038969 A1 | * | 3/2014 | ........... G01G 21/286 |

* cited by examiner

DRAFT SHIELD COMPRISING A SWIVELING DOOR

CROSS-REFERENCE TO RELATED APPLICATIONS

This application claims the benefit of European Application No. EP 23166631.4 filed Apr. 4, 2023, the disclosures of which are hereby incorporated by reference as if fully restated herein.

TECHNICAL FIELD

The present disclosure relates to a draft shield comprising a swiveling door.

BACKGROUND ART

Draft shields are used, for instance, in connection with high precision balances to shield the weighing goods and mechanics from environmental influences, like movements of air, which could otherwise detrimentally influence high precision measurements. Draft shields, as such, are abundantly known in the art.

Most conveniently, draft shields comprise doors through which a weighing good can be transferred into and out of the interior space or weighing chamber defined by the draft shield. In common embodiments, the doors are sliding side doors which are displaced from the front to the back of the balance for opening. This, however, requires that the width of the draft shield is at least as large as the width of the housing of the balance which contains the electronics and a weighing cell. This issue gets the more accentuated in so-called front loader balances, in which the weighing cell, i.e., the transducer transforming the gravitational force of the weighing good into an electric signal, is placed behind the weighing pan. Said type of balances yields certain advantages which are not to be discussed in detail in this context. However, the size of the housing increases for instance when compared to a so-called top loader balance. As it may be found desirable to maintain the volume enclosed by the draft shield as small as practically possible for the intended use, it might be found desirable to design the draft shield narrower than the housing of the balance which contains the electronics and a weighing cell. This, in turn, prevents opening the sliding side doors by a displacement towards the back of the balance, i.e., the use of slide doors which open towards the back of the balance is not possible.

Opening the sliding doors by displacement to the front of the balance is generally possible, however restricts the capability, for instance, to place a terminal conveniently in front of the balance. A further drawback related to sliding doors in general may be seen in that the sliding doors are guided in guideways. Cleaning of the guideways may turn out fairly difficult, while dirt in a guideway may result in cross-contamination and eventually increase resistance and impede movement of the door.

Other types of doors for draft shields may be hingedly attached to a stationary housing of the draft shield, wherein the hinge axis extends parallel to an edge of the door. It will be appreciated that the movement of a hinged door requires a relatively large space on the side of the draft shield. Furthermore, as opening and closing a hinged door involves movement of the door perpendicular to its face, said movement may itself result in agitating the air inside the draft shield, which may in turn agitate the weighing pan with the weighing good placed thereon and thus yield detrimental effects on the precision of the measurement.

SUMMARY OF INVENTION

The herein claimed invention relates to the subject matter set forth in the claims.

It is an object of the present disclosure to provide the subject matter initially mentioned. More specifically, a draft shield of the type initially mentioned is suggested. In aspects, a draft shield is suggested that overcomes certain drawbacks of the prior art. In more specific aspects, the herein proposed draft shield overcomes the drawbacks of the art mentioned above. In a specific aspect, the draft shield is applicable in applications wherein a housing of the balance which contains the electronics and/or a weighing cell is wider than the draft shield, or, other way round, the draft shield is narrower than said housing of the balance. This may provide the possibility to even further restrict a volume contained inside the draft shield to a size required to include a weighing pan and the weighing good, and, as the case may be, further elements required for the function of the balance, such as devices for automatic handling of weighing goods inside the weighing chamber defined inside the draft shield, without opening a door. In other aspects, guideways which might in some cases be prone to contamination and/or may be difficult to clean is avoided. In still further aspects, the doors of the draft shield is provided to minimize agitation of air inside the draft shield during opening and closing of a door.

This is achieved by the subject matter set forth in the claims. Further effects and advantages of the disclosed subject matter, whether explicitly mentioned or not, will become apparent in view of the disclosure provided below.

Accordingly, disclosed is a draft shield for a balance comprising a first wall, a second wall and at least one door, i.e., at least a first door. It is noted that the first door may, in embodiments, be the only door, but in common embodiments be a first one of two doors. It is further not excluded that the first door might be one door out of two or more doors. One of the first and second walls may be a top wall of the draft shield, while the other one of first and second walls may be a front wall of the draft shield. For instance, the first wall may be a top wall of the draft shield, while the second wall is a front wall of the draft shield. The first wall and the second wall adjoin each other perpendicularly and the first door is provided perpendicular to each of the first wall and the second wall. The first door is arranged and configured to swivel between a closed position and an open position, wherein in the closed position the first door adjoins a first edge of the first wall and a first edge of the second wall, wherein a swivel axis of the first door extends perpendicular to a face of the first door such that the first door is configured to swivel in the plane of the first door, i.e., a plane defined by an areal extent of the door, which may be considered at least essentially plate-shaped.

Adjoin, as herein used, shall indicate that two elements are provided in close neighborhood to each other, or adjacent to each other, and shall not necessarily imply that two elements are connected or joined to each other. In the context of the present document the terms "adjoining", "bordering" and "adjacent" as well as "adjoining", "bordering" and "adjacent to", and any grammatical forms derived therefrom, are considered as synonyms.

It is noted that within the framework of the present disclosure the use of the indefinite article "a" or "an" does in no way stipulate a singularity nor does it exclude the presence of a multitude of the named member or feature. It is thus to be read in the sense of "at least one" or "one or a multitude of".

In embodiments, the draft shield may comprise exactly one front wall, exactly one top wall, and a first door. The other side of the draft shield may be provided with either a side wall or a second door. A back side and a bottom side of the draft shield may be open, i.e., without a wall, and will in use be covered by the balance. Directions and orientations of the draft shield, like top, bottom or "side", refer to the intended use of the draft shield and are readily and clearly identified by a person having skill in the art. In certain embodiments, it may be provided that the closed faces of the draft shield may comprise the top and front face, while an open face is a bottom face or one of a back face and a bottom face, and the at least one door defines a side face of the draft shield.

The first door may be provided such that in the open position the first door adjoins the first edge of the first wall while being distant to at least a part of the first edge of the second wall. In more particular embodiments, in the open position an edge of the first door may adjoin the first edge of the first wall while being distant to, or remote from, at least a part of the first edge of the second wall.

The first door may be configured to swivel 80° or more and 100° or less around its swivel axis. In particular embodiments, the first door may be configured to swivel at least approximately 90° around its swivel axis.

The swivel axis of the first door may be provided by the axis of a first shaft. The first shaft may in embodiments be supported in a bearing assembly of the first shaft, wherein said bearing assembly of the first shaft is attached to the first wall. The first shaft may in embodiments be fixedly attached to the first door and rotatably be received in the bearing assembly of the first shaft. The bearing assembly of the first shaft may further in particular comprise a drive mechanism which is adapted and configured to drive the swivel movement of the first door in at least one swivel direction. For one instance, the drive assembly may be adapted and configured to drive the first door from a closed position to an open position. The drive mechanism may include a spring, in more specific embodiments a coil spring, which is tensioned when the first door is in one of the closed or open positions and thus drives the door into the other one of the closed or open positions when the first door is released. For instance, the drive mechanism may be configured such that the spring is tensioned while moving the first door from the open position to the closed position. It may further be provided that a mechanism is provided, for instance by the draft shield, which releasable secures the first door in the closed position. Upon release of the first door in the closed position, the tensioned spring may autonomously drive the first door from the closed position to the open position. The bearing assembly may further comprise a rotation brake to achieve a smooth swivel movement of the first door when driven by the tensioned spring. The rotation brake may be configured to retard the swivel motion of the first door through fluid friction. The rotation brake may further be mounted to the bearing assembly to act on the first shaft. The first shaft may, in particular, be fixedly attached to the first door and rotatably be received in the bearing assembly of the first shaft. The first shaft may connect to the first door adjacent a corner of the first door.

The draft shield may further comprise a second door on a side of the draft shield opposite to the side on which the first door is provided. The second door may comprise any of the features attributed to the first door above, alone or in combination with one or more other features. The second door may in particular embodiments comprise the same features as the first door, and may, in embodiments, be a mirrored version of the first door.

To this extent, the second door, if present, is arranged and configured to swivel between a closed position and an open position, wherein in the closed position the second door adjoins a second edge of the first wall and a second edge of the second wall. A swivel axis of the second door extends perpendicular to the face of the second door such that the second door is configured to swivel in a plane of the second door, i.e., a plane defined by an areal extent of the second door, which may be considered at least essentially plate-shaped. The swivel axis of the second door is, at least essentially, parallel to the swivel axis of the first door. More specifically, it may be provided that the swivel axis of the first door and the swivel axis of the second door are, at least essentially, parallel to each other or in particular are, at least essentially, congruent or identical.

In the open position, the second door, if present, may adjoin the second edge of the first wall while being distant to, or remote from, at least a part of the second edge of the second wall. More specifically, in the open position, an edge of the second door, if present, may adjoin the second edge of the first wall while being distant to, or remote from, at least a part of the second edge of the second wall.

The second door may be configured to swivel 80° or more and 100° or less around its swivel axis. In particular embodiments, the second door may be configured to swivel at least approximately 90° around its swivel axis.

The swivel axis of the second door may be provided by the axis of a second shaft. The second shaft may in embodiments be supported in a bearing assembly of the second shaft, wherein said bearing assembly of the second shaft is attached to the first wall. The second shaft may in embodiments be fixedly attached to the second door and rotatably be received in the bearing assembly of the second shaft. The bearing assembly of the second shaft may further in particular comprise a drive mechanism which is adapted and configured to drive the swivel movement of the second door in at least one swivel direction. For one instance, the drive assembly may be adapted and configured to drive the second door from a closed position to an open position. The drive mechanism may include a spring, in more specific embodiments a coil spring, which is tensioned when the second door is in one of the closed or open position and thus drives the door into the other one of the closed or open position when the second door is released. For instance, the drive mechanism may be configured such that the spring is tensioned while moving the second door from the open position to the closed position. It may further be provided that a mechanism is provided, for instance by the draft shield, which releasable secures the second door in the closed position. Upon release of the second door in the closed position, the tensioned spring may autonomously drive the second door from the closed position to the open position. The bearing assembly may further comprise a rotation brake to achieve a smooth swivel movement of the second door when driven by the tensioned spring. The rotation brake may be configured to retard the swivel motion of the second door through fluid friction. The rotation brake may further be mounted to the bearing assembly to act on the second shaft. The second shaft may, in particular, be fixedly attached to the second door and rotatably be received in the bearing assembly of the second shaft. The second shaft may connect to the second door adjacent a corner of the second door.

It is understood that the features and embodiments disclosed above may be combined with each other. It will further be appreciated that further embodiments are conceivable within the scope of the present disclosure and the claimed subject matter which are obvious and apparent to the skilled person by virtue of the present disclosure.

BRIEF DESCRIPTION OF DRAWINGS

The subject matter of the present disclosure is now to be explained in more detail by means of selected exemplary embodiments shown in the accompanying drawings. The figures show.

It is understood that the drawings may be highly schematic, and details not required for instruction purposes may have been omitted for the ease of understanding and depiction. It is further understood that the drawings show only selected, illustrative embodiments, and embodiments not shown may still be well within the scope of the herein disclosed and/or claimed subject matter.

DESCRIPTION OF EMBODIMENTS

Figure 1:
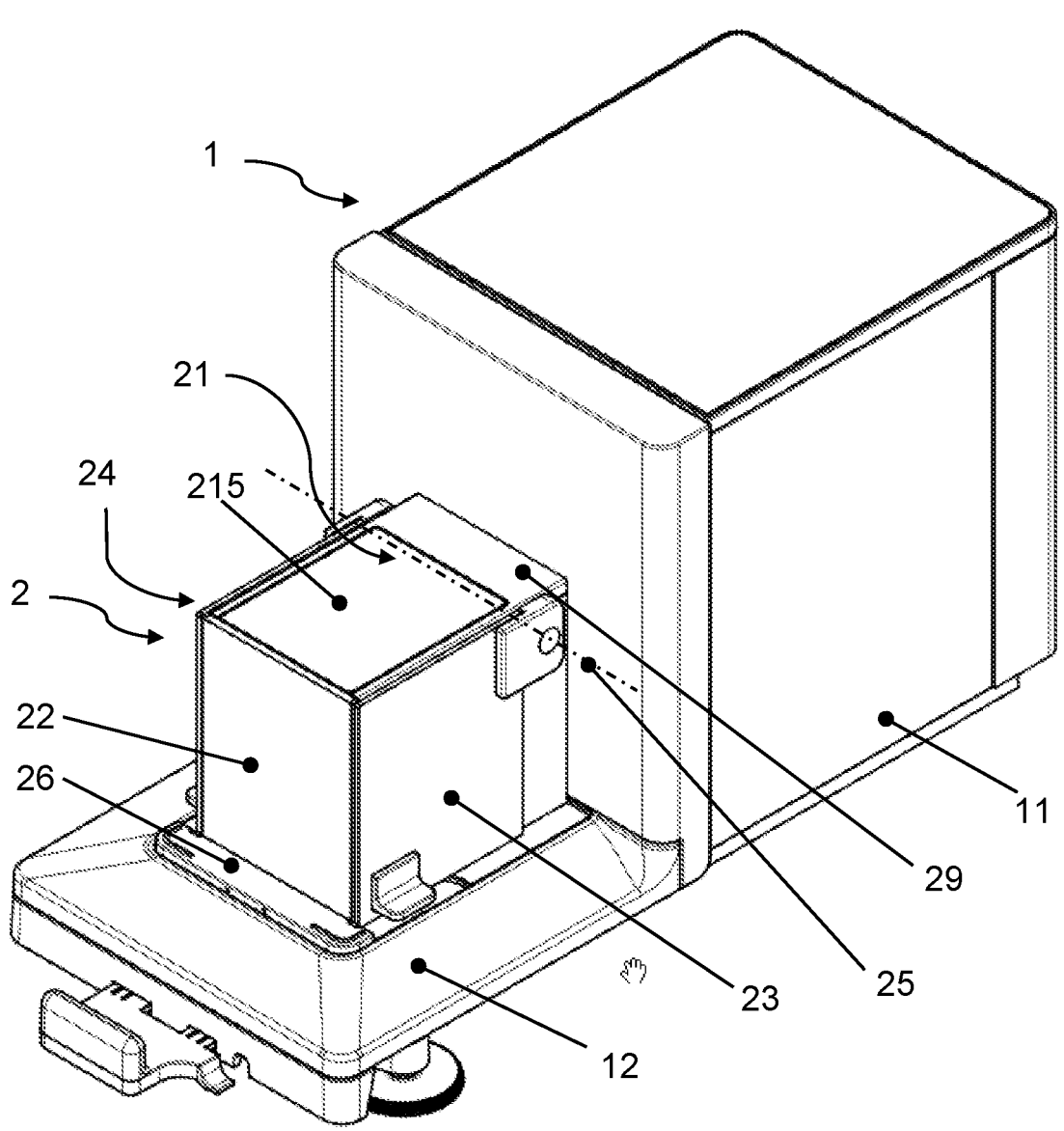
FIG. 1 a balance comprising a draft shield of the above discussed type.

FIG. 1 shows an exemplary embodiment of a balance 1 which is equipped with a draft shield 2 of any type outlined above. Balance 1 is a so-called front loader balance in which the weighing cell is provided within housing 11, which further contains electronics for power supply, data processing, and so forth, while the weighing pan on which a weighing good may be placed for weight determination is suspended in front of housing 11 and functionally connected to the weighing cell inside housing 11. Draft shield 2 is placed in front of housing 11, on base 12. In a manner familiar to the person skilled in the art, draft shield 2 covers a weighing pan of the balance and, optionally, other devices required to handle weighing goods and weights inside a weighing chamber defined inside draft shield 2. Draft shield 2 comprises frame 29. A first wall or top wall 21 of draft shield 2 comprises a part of frame 29 and a transparent window 215 inserted into frame 29. A second wall or front wall 22 of draft shield 2 adjoins a front edge of top wall 21. Front wall 22 may in particular be a transparent wall. Draft shield 2 further comprises doors 23 and 24 provided on opposing sides of draft shield 2. Each of doors 23 and 24 is plate-shaped and accordingly defines a plane of the respective door by the plane in which the plate extends. Doors 23 and 24 are configured to swivel around an axis 25, wherein the swiveling movement takes place in the plane of the respective door. That is, in other words, axis 25 is perpendicular to each of doors 23 and 24, or the plane thereof, respectively. The pivot point of the swiveling movement is adjacent a corner of the respective door. As will become apparent by virtue of the description below, doors 23 and 24 are arranged and configured to swivel between a closed position and an open position. Further, lock- and release mechanism 26 is provided to lock doors 23 and 24 in their closed positions, and to release them for swiveling into their open positions. The functionality of lock- and release mechanism 26 is outlined in more detail below.

Figure 2:
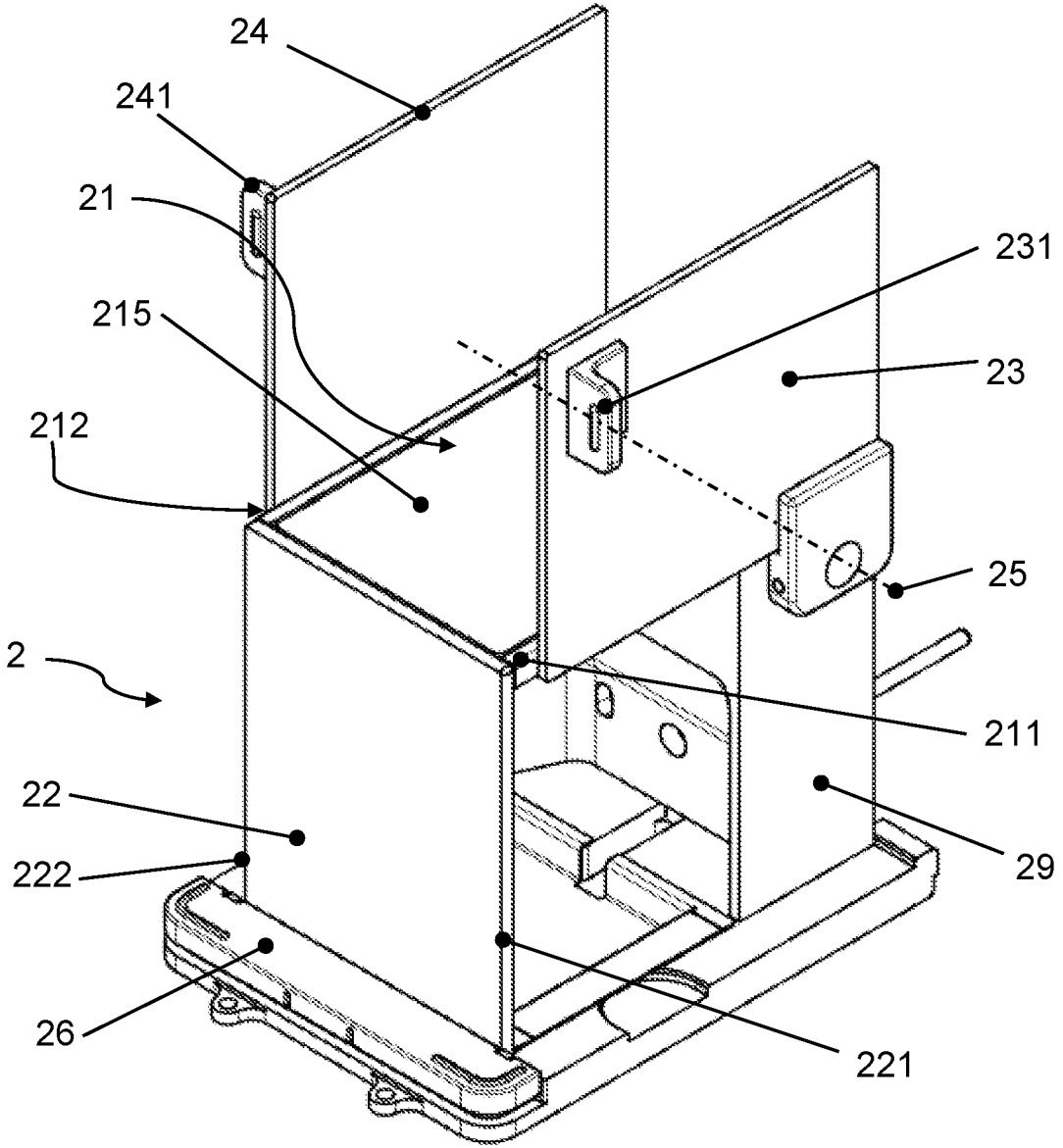
FIG. 2 an embodiment of a draft shield of the above discussed type, comprising two doors which are open.
Figure 3:
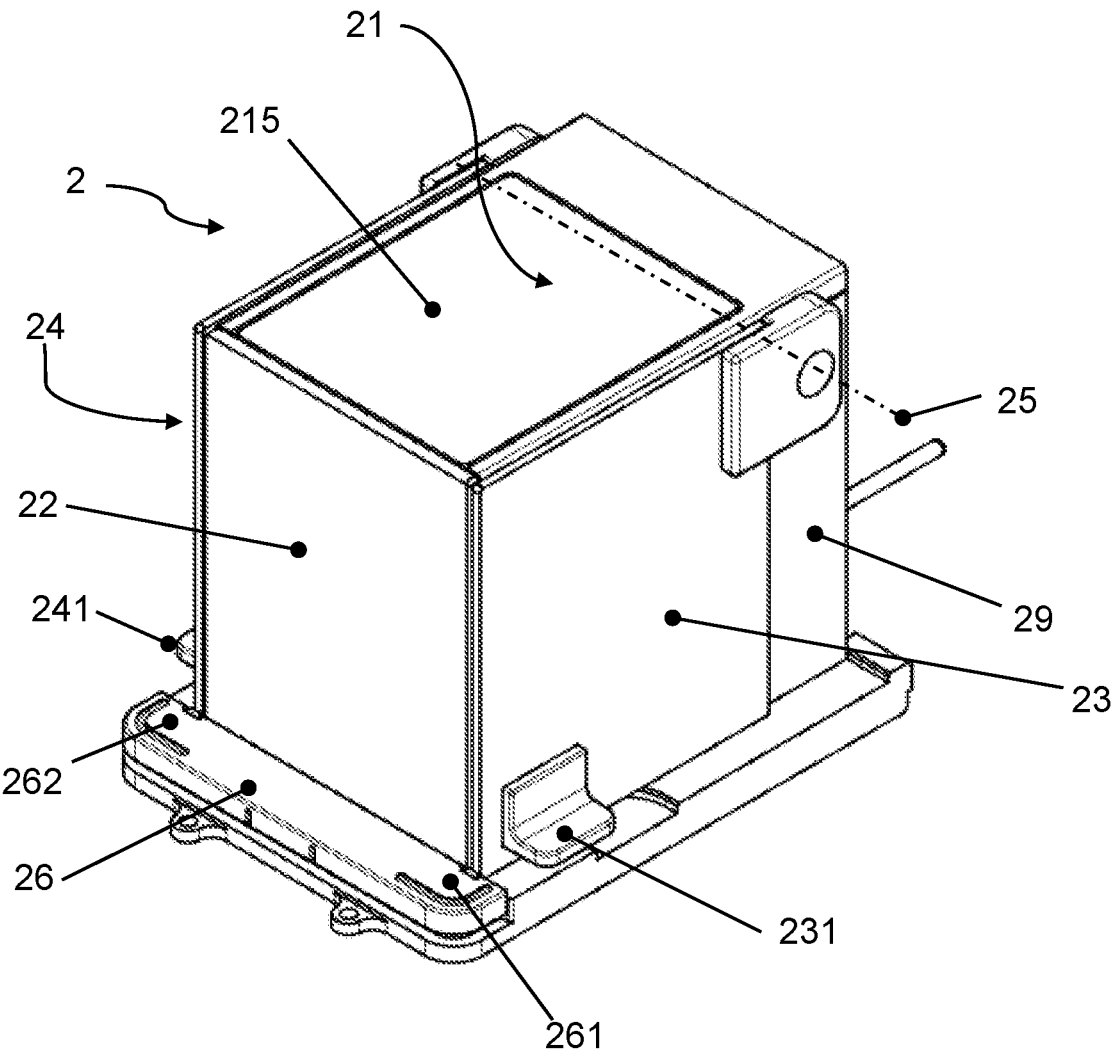
FIG. 3 the draft shield of FIG. 2 with the doors closed.

FIG. 2 shows draft shield 2 with doors 23 and 24 opened. Top wall 21 has a first edge 211 on the side of first door 23 and a second edge 212 on the side of second door 24. Likewise, front wall 22 has a first edge 221 on the side of first door 23 and a second edge 222 on the side of second door 24. As can be seen, first door 23, in the shown open position, is adjacent to, or adjoins, first edge 211 of top wall 21 and is distant from first edge 221 of front wall 22. Likewise, as the skilled person will readily appreciate, second door 24, in the open position, is adjacent, or adjoins, second edge 212 of top wall 21 and is distant from second edge 222 of front wall 22. As is outlined in more detail below, swivel axis 25 of each of the doors 23 and 24 is provided by the axis of a shaft which is attached to the respective door. Further, handles 231, 241 are attached to an outside of doors 23 and 24. Handles 231 and 241 may be used to manually close doors 23 and 24. FIG. 3 shows draft shield 2 with doors 23 and 24 in their respective closed positions. As will become apparent by virtue of FIG. 3 in combination with the depiction of FIG. 2, in the closed position first door 23 is adjacent to, or adjoins, first edge 211 of top wall 21 as well as first edge 221 of front wall 22. Likewise, second door 24, in the closed position, adjoins second edge 212 of top wall 21 and second edge 222 of front wall 22. Further, as will become apparent by the description below, doors 23 and 24 are locked in the respective closed positions by lock- and release mechanism 26 and may be released by pressing a respective one of release buttons 261 and 262. As will further become apparent by the description below, draft sheet 2 comprises drive mechanisms which drive a respective one of doors 23, 24 into the open position upon releasing the respective one of the doors by pressing the respective one of release buttons 261 and 262. It will further be readily appreciated, by virtue of the combined view of FIGS. 2 and 3, that doors 23 and 24 are configured to swivel at least approximately 90° around swivel axis 25.

Figure 4:
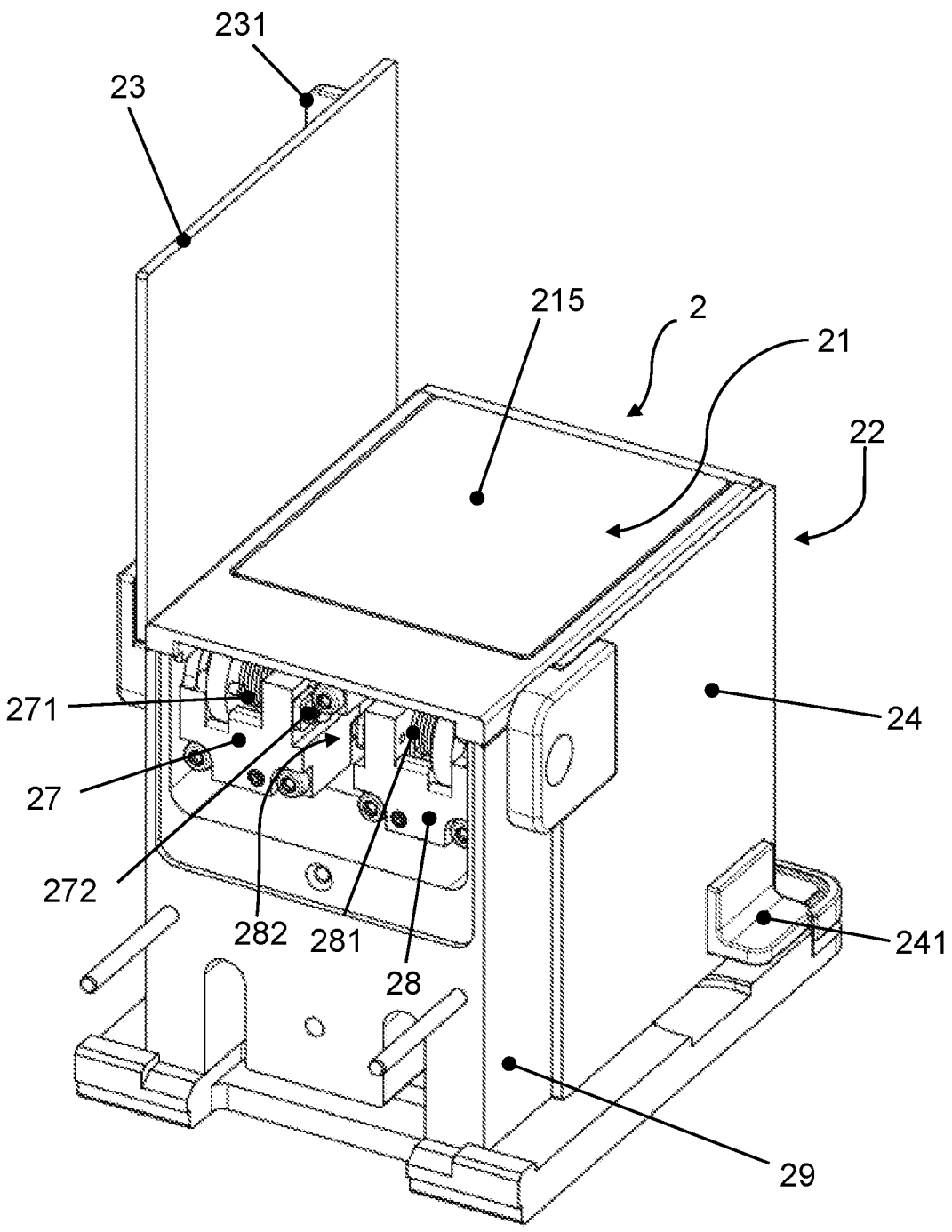
FIG. 4 the draft shield of FIGS. 2 and 3 in a view from a back side, with a first door open and a second door closed.

FIG. 4 shows a back view of draft shield 2. Combined bearing and drive assemblies 27 and 28 are attached to a lower face of top wall 21, and more specifically to a respective section of frame 29. Although not explicitly shown, it is apparent to a person having skill in the art how the shafts providing the swivel axis of doors 23 and 24 are received in and supported by combined bearing and drive assemblies 27 and 28. Bearing and drive assembly 27 comprises coil spring 271. Coil spring 271 is mounted inside bearing and drive assembly 27 and functionally coupled to the shaft connected to door 23 such that coil spring 271 is tensioned upon swiveling door 23 from the open position towards the closed position. Thus, when releasing door 23 in the closed position, or in any position between the closed position in the open position, coil spring 271 drives door 23 towards the open position. Coil spring 271 is further mounted such that coil spring 271 remains tensioned when door 23 is in the open position so as to securely hold door 23 in the open position. Bearing and drive assembly 27 further comprises rotation brake 272, which is adapted and configured in functional connection with the shaft connected to door 23 to retard the swiveling motion of door 23 from the closed position to the open position, driven by coil spring 271. The function of rotation brake 272 may, in particular, be based upon fluid friction and effects a smooth movement of door 23 to the open position. Bearing and drive assembly 28 has the same functionality in connection with second door 24: Bearing and drive assembly 28 supports a shaft, which is not explicitly shown, but is familiar to a skilled person, which is connected to second door 24. Bearing and drive assembly 28 comprises coil spring 281. Coil spring 281 is mounted inside bearing and drive assembly 28 and is functionally coupled to the shaft connected to door 24 such that coil spring 281 is tensioned upon swiveling door 24 from the open position towards the closed position. Thus, when releasing door 24 in the closed position, or in any position between the closed position in the open position, coil spring 281 drives door 24 towards the open position. Coil spring 281 is further mounted such that coil spring remains tensioned when door 24 is in the open position so as to securely hold door 24 in the open position. Bearing and drive assembly 28 further comprises rotation brake 282, which is adapted and configured in functional connection with the shaft connected to door 28 to retard the swiveling motion of door 24 from the closed position to the open position, driven by coil spring 281. The function of rotation brake 282 may, in particular, be based upon fluid friction and effects a smooth movement of door 24 to the open position.

Figure 5:
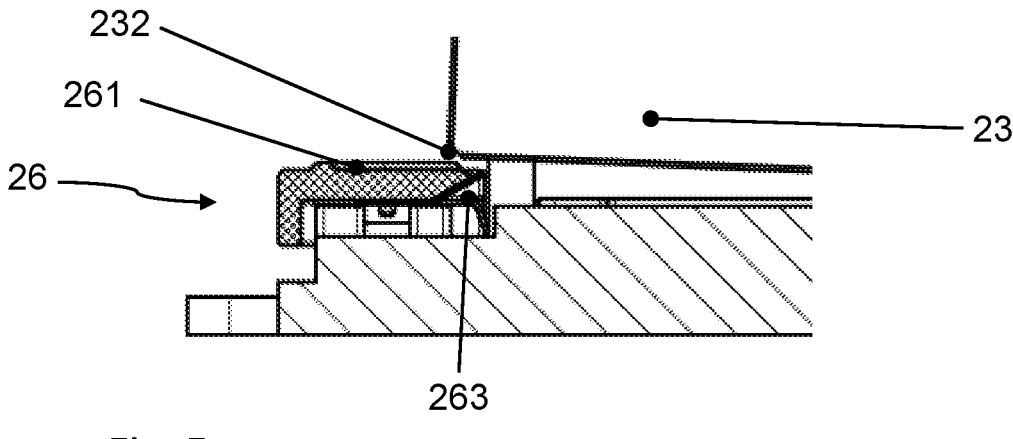
FIG. 5 a detail view of a lock- and release mechanism adapted and configured to hold a door in the closed position with a tensioned spring of a drive mechanism.
Figure 6:
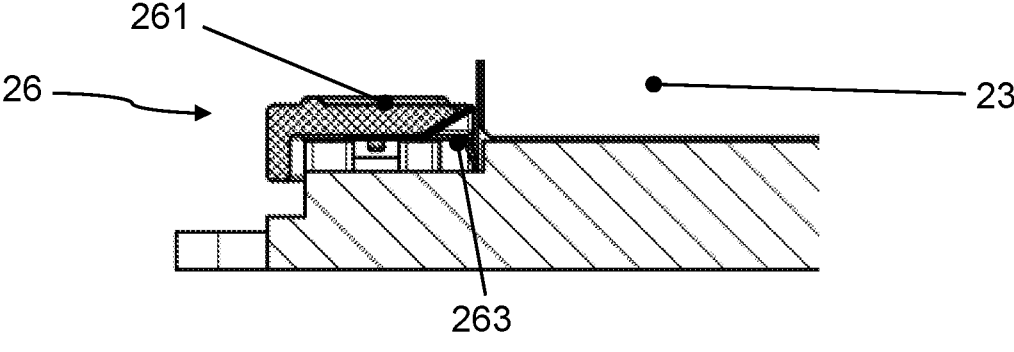
FIG. 6 the detail view of FIG. 5 with the door fixed in the closed position with a tensioned spring of a drive mechanism.

FIGS. 5 and 6 outlined details and function of lock- and release mechanism 26. Lock- and release mechanism 26 comprises release button 261 and spring 263. For one instance, release button 261 may be made from plastic, while spring 263 may, in particular, be a metal spring. FIG. 5 shows door 23 in a position which would be immediately before locking when moving door 23 towards the closed position. The lower corner of door 23 adjacent lock- and release mechanism 26 comprises a chamfer 232. When swiveling door 23 further towards the closed position, i.e., counterclockwise in the shown depiction, chamfer 232 will make contact with an edge of release button 261 and spring 263. Due to the sloped geometry of chamfer 232, release button 261 will be displaced by elastic deformation of lock- and release mechanism 26, and further spring 263 will be elastically deformed. With reference to FIG. 6, door 23 is shown in the closed position. The restoring force of spring 263 effects a friction lock of door 23 in the closed position. Spring 263 can be deformed by exerting pressure on release button 261, thereby releasing door 23. When door 23 is released, bearing and drive assembly 27, cf. FIG. 4, will automatically drive door 23 to the open position, that is, clockwise in the current depiction. Thus, a convenient semi-automatic door drive mechanism is provided.

While the subject matter of the disclosure has been explained by means of exemplary embodiments, it is understood that these are in no way intended to limit the scope of the claimed invention. It will be appreciated that the claims cover embodiments not explicitly shown or disclosed herein, and embodiments deviating from those disclosed in the exemplary modes of carrying out the teaching of the present disclosure will still be covered by the claims.

REFERENCE SIGNS LIST

1 Balance
2 Draft shield
11 Housing of balance
12 Base of balance
21 Top wall of draft shield
22 Front wall of draft shield
23 Door of draft shield
24 Door of draft shield
25 Swivel axis of door of draft shield
26 Lock- and release mechanism

8

27 Combined bearing and drive assembly
28 Combined bearing and drive assembly
29 Frame of draft shield
211 Edge of top wall
212 Edge of top wall
215 Window
221 Edge of front wall
222 Edge of front wall
231 Handle
232 Chamfered corner of door
241 Handle
261 Release button
262 Release button
263 Spring
271 Coil spring
272 Rotation brake
281 Coil spring
282 Rotation brake

What is claimed is:

1. A draft shield for a balance, the draft shield comprising:
a first wall;
a second wall; and
at least a first door;
wherein the first wall and the second wall adjoin each other perpendicularly, and the first door is provided perpendicular to each of the first wall and the second wall;
wherein the first door is arranged and configured to swivel between a closed position and an open position;
wherein, in the closed position, the first door adjoins a first edge of the first wall and a first edge of the second wall;
wherein a swivel axis of the first door extends perpendicular to a face of the first door such that the first door is configured to swivel in the plane of the first door.

2. The draft shield of claim 1, wherein:
in the open position, the first door adjoins the first edge of the first wall while being distant to at least a part of the first edge of the second wall.

3. The draft shield of claim 1, wherein:
the first door is configured to swivel 80° or more and 100° or less around its swivel axis.

4. The draft shield of claim 1, wherein:
the swivel axis of the first door is provided by the axis of a first shaft.

5. The draft shield of claim 4, wherein:
the first shaft is supported in a bearing assembly of the first shaft.

6. The draft shield of claim 5, wherein:
said bearing assembly of the first shaft is attached to the first wall.

7. The draft shield of claim 5, wherein:
the bearing assembly of the first shaft comprises a drive mechanism which is adapted and configured to drive the swivel movement of the first door in at least one swivel direction.

8. The draft shield of claim 4, wherein:
the first shaft connects to the first door adjacent to a corner of the first door.

9. The draft shield of claim 1, wherein:
the draft shield comprises a second door on an opposite side of the draft shield from the first door;
the second door is arranged and configured to swivel between a closed position and an open position;
in the closed position, the second door adjoins a second edge of the first wall and a second edge of the second wall;

a swivel axis of the second door extends perpendicular to the face of the second door such that the second door is configured to swivel in a plane of the second door;

the swivel axis of the second door is parallel to the swivel axis of the first door.

10. The draft shield of claim 9, wherein:

the swivel axis of the first door and the swivel axis of the second door are parallel to each other.

11. The draft shield of claim 10, wherein:

the swivel axis of the first door and the swivel axis of the second door are identical.

12. The draft shield of claim 9, wherein:

in the open position, the second door adjoins the second edge of the first wall while being distant to at least a part of the second edge of the second wall.

13. The draft shield of claim 9, wherein:

the second door is configured to swivel 80° or more and 100° or less around its swivel axis.

14. The draft shield of claim 9, wherein:

the swivel axis of the second door is provided by the axis of a second shaft.

15. The draft shield of claim 9, wherein:

the second shaft is supported in a bearing assembly of the second shaft.

16. The draft shield of claim 15, wherein:

the bearing assembly of the second shaft is attached to the first wall.

17. The draft shield of claim 15, wherein:

the bearing assembly of the second shaft comprises a drive mechanism which is adapted and configured to drive the swivel movement of the second door in at least one swivel direction.

18. The draft shield of claim 9, wherein:

the second shaft connects to the second door adjacent a corner of the second door.

\* \* \* \* \*